Dec. 26, 1950    G. M. McGUCKIN    2,535,220
APPARATUS FOR SOLVING SEISMIC PROBLEMS FOR
LOCATION AND DIP OF REFLECTING BEDS
Filed Dec. 10, 1946    7 Sheets-Sheet 1

INVENTOR
GLENN M. McGUCKIN
BY
Sidney A. Johnson
ATTORNEY

Dec. 26, 1950 G. M. McGUCKIN 2,535,220
APPARATUS FOR SOLVING SEISMIC PROBLEMS FOR
LOCATION AND DIP OF REFLECTING BEDS
Filed Dec. 10, 1946 7 Sheets-Sheet 2

INVENTOR
GLENN M. McGUCKIN
BY
Sidney A. Johnson
ATTORNEY

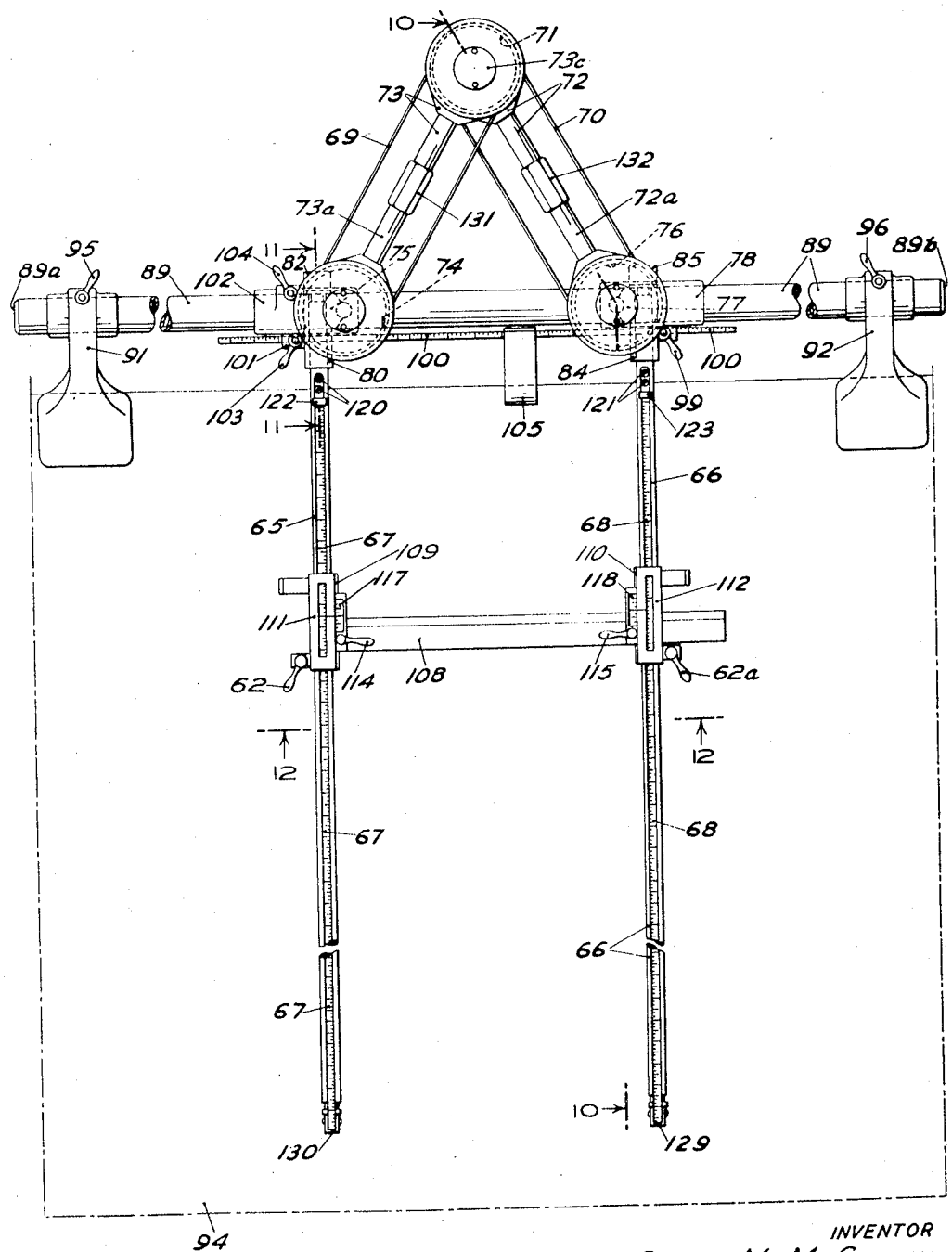

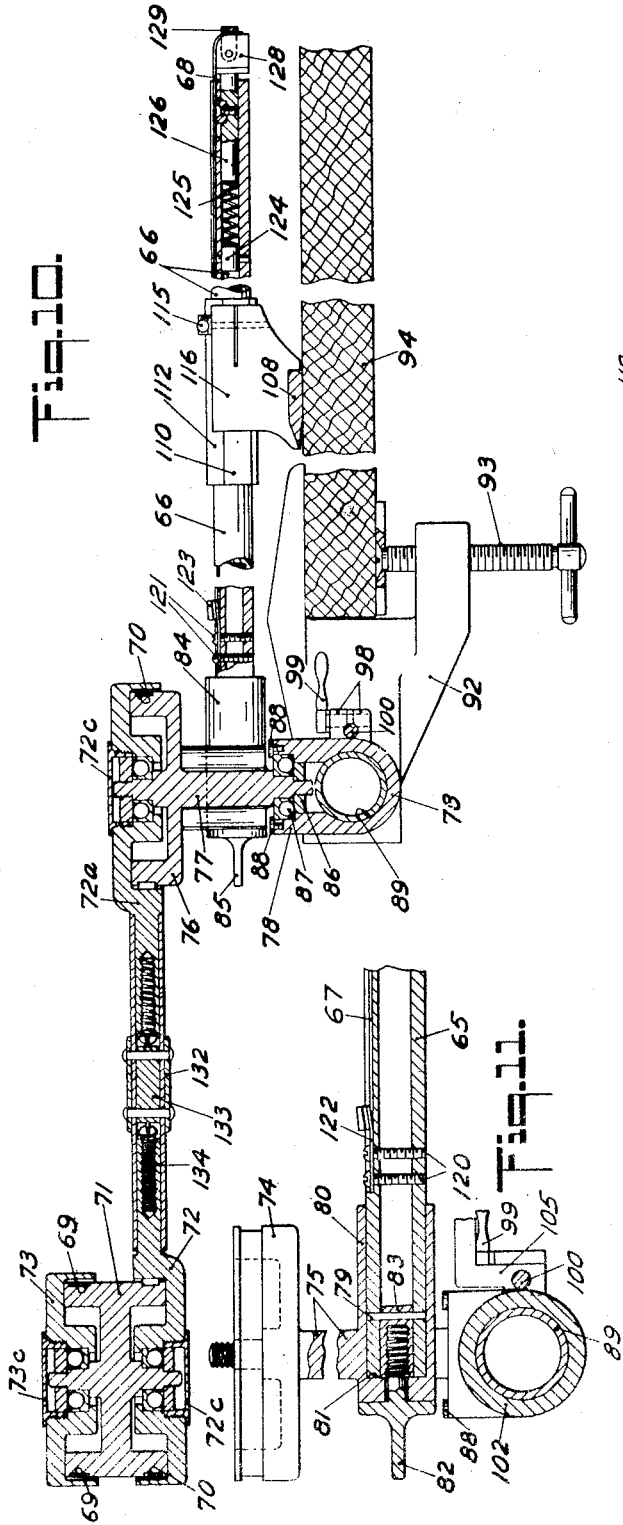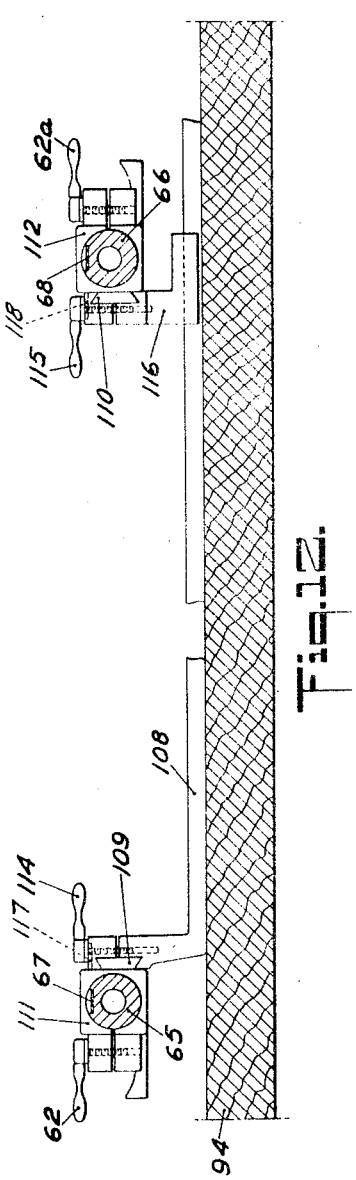

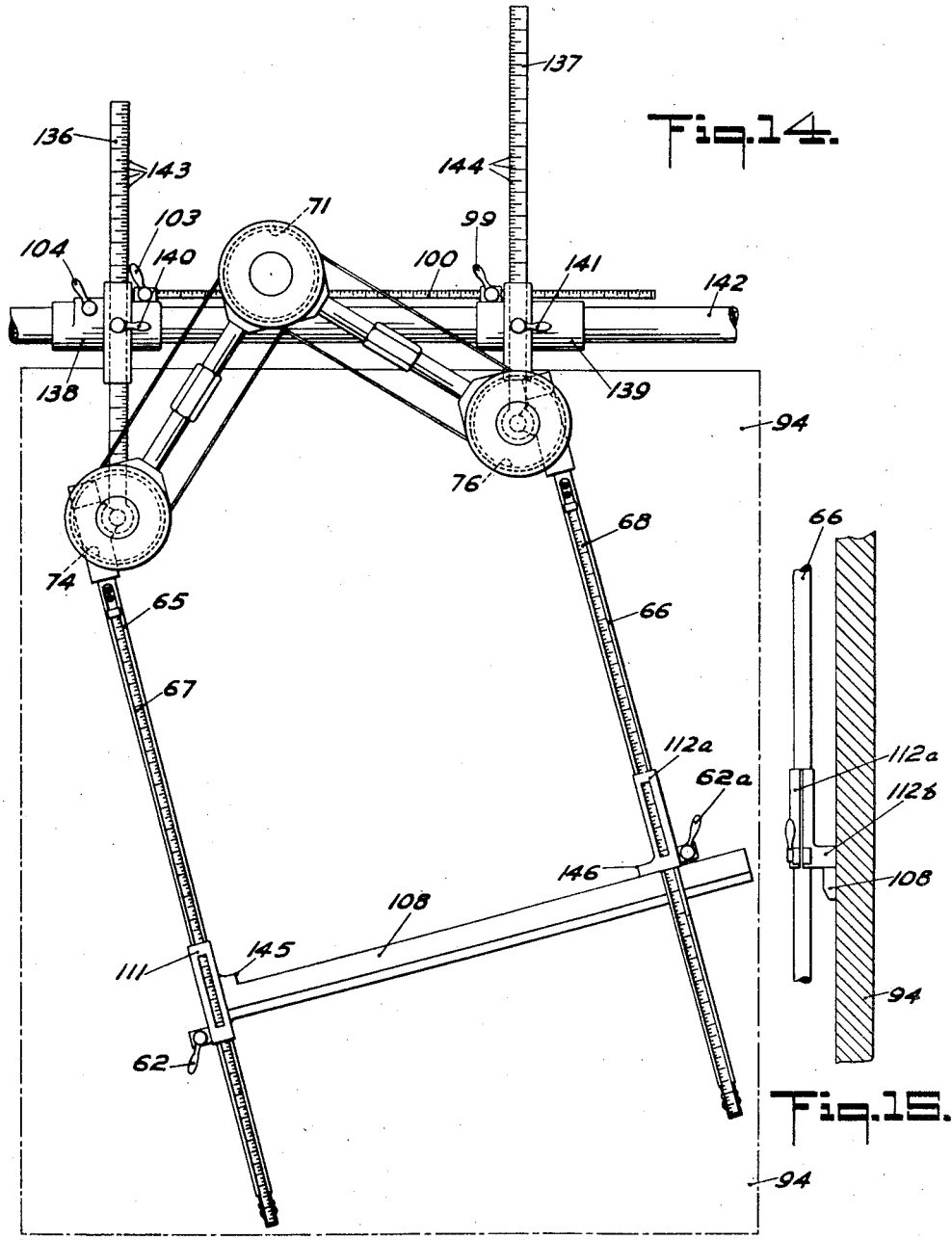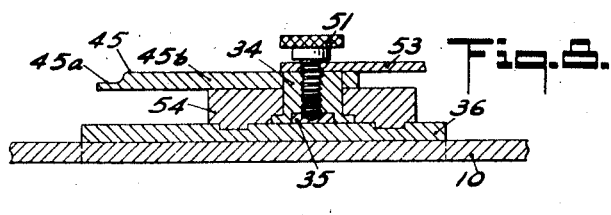

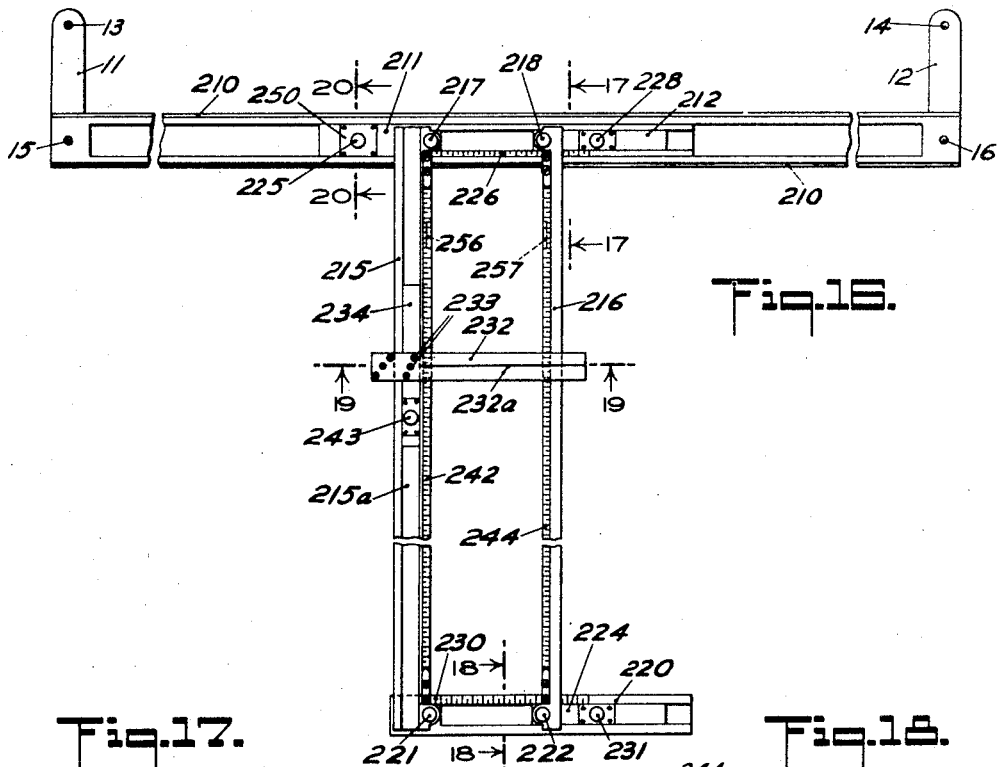
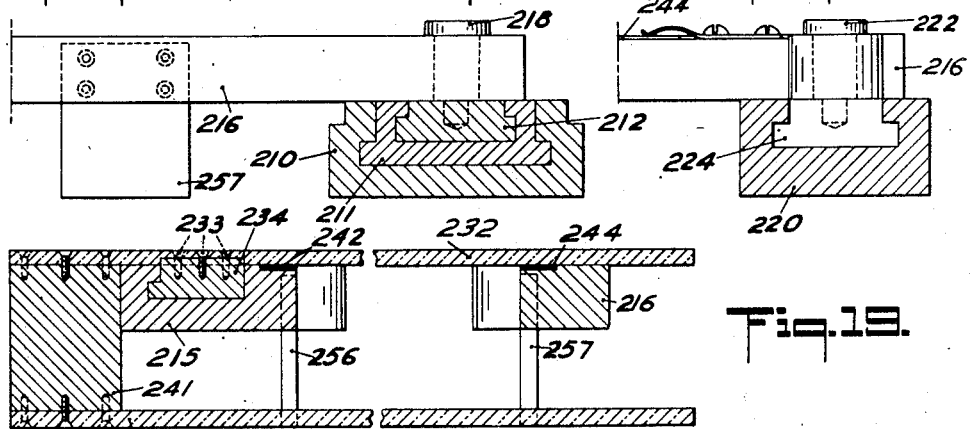
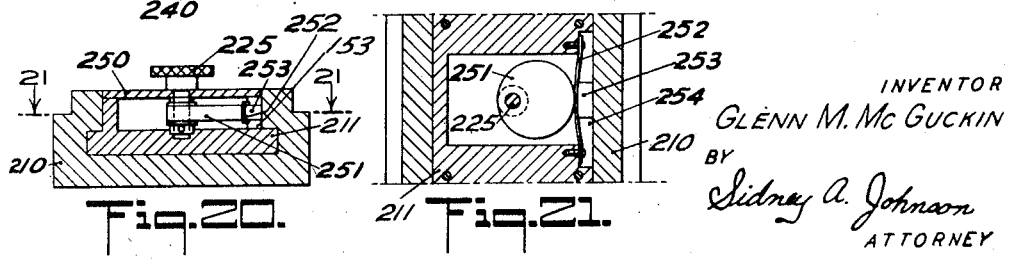

Patented Dec. 26, 1950

2,535,220

UNITED STATES PATENT OFFICE 2,535,220

APPARATUS FOR SOLVING SEISMIC PROBLEMS FOR LOCATION AND DIP OF REFLECTING BEDS

Glenn M. McGuckin, Corpus Christi, Tex., assignor, by mesne assignments, to Socony-Vacuum Oil Company, Incorporated, New York, N. Y., a corporation of New York Application December 10, 1946, Serial No. 715,212

16 Claims. (Cl. 33—76)

1

This invention relates to an instrument or apparatus for solving problems arising in seismic surveying, particularly for the rapid and accurate determination of the location and dip of reflecting beds.

After a seismic survey of a given area has been completed, topographical subsurface maps are constructed and from the contours of the subsurface strata valuable deductions can be made with respect to the probability of the presence of oil or other deposits. In order to determine the topographic character of the subsurface strata, it is necessary to determine its dip or slope. Heretofore, the determination of the dip of a reflecting region or interface between two strata has required extensive calculation, either by solution of equations or by graphic methods of an involved character.

Apparatus has also been proposed by means of which the image point of the shotpoint may be located and with this information, a geometrical solution may be utilized in determining the slope of the interface. In utilizing seismic data, certain assumptions are sometimes made to simplify the calculations. Some of these assumptions result in the determination of dip directly below the datum or shotpoint; whereas in accordance with more generally accepted theory the location of the interface which gives rise to a particular reflection will be located to one side or other of the shotpoint, depending upon whether the dip is up-grade or down-grade; that is, whether the slope is positive or negative.

In accordance with the present invention, an apparatus is provided which, after suitable setting of its various component parts, automatically solves the dip-determining problem and not only shows the direction and extent of the dip but it also locates the reflecting interface or subsurface region in its true position. The operation is relatively simple and greatly facilitates the completion of maps, cross sections, charts and the like, based upon data secured from conventional seismic methods.

For a more detailed understanding of the invention and for further objects and advantages thereof, reference is to be had to the following description taken in conjunction with the accompanying drawings, in which.

2

Figure 1:
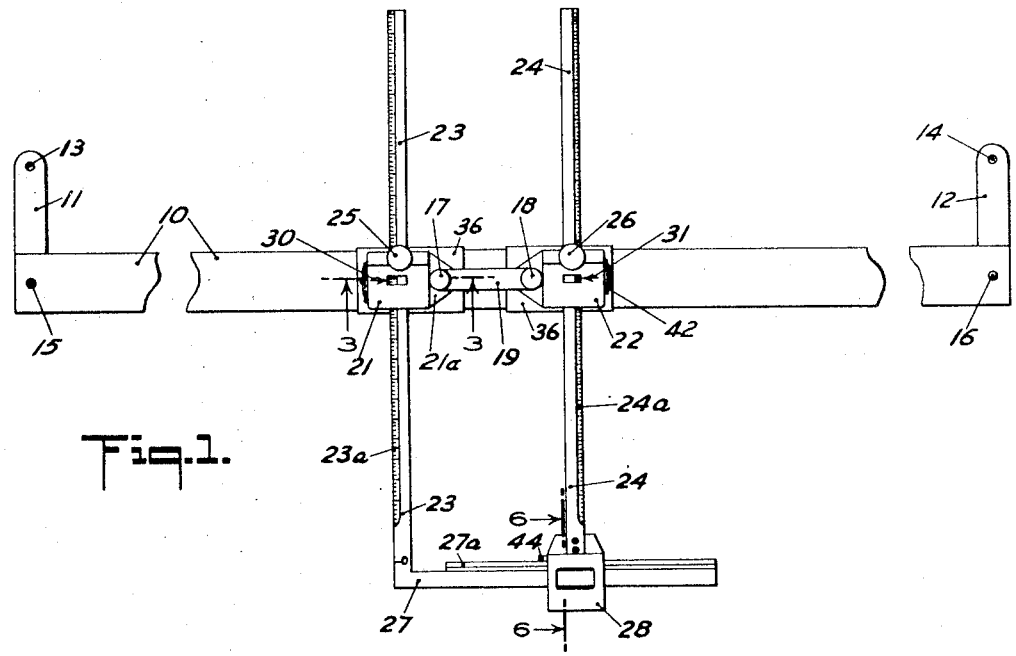
Fig. 1 is a plan view of an apparatus embodying one form of the invention.
Figure 3:
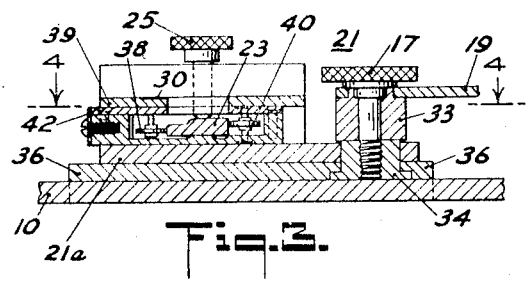
Fig. 3 is a sectional elevation taken on the line 3—3 of Fig. 1.
Figure 6:
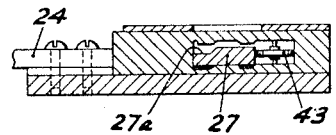
Figure 4:
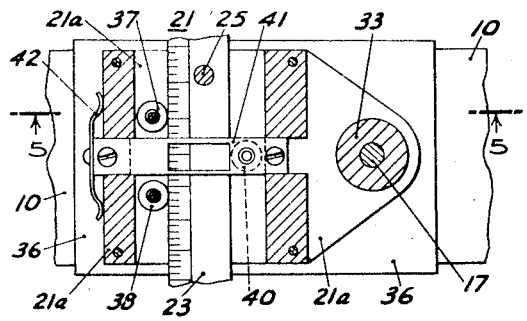
Figure 5:
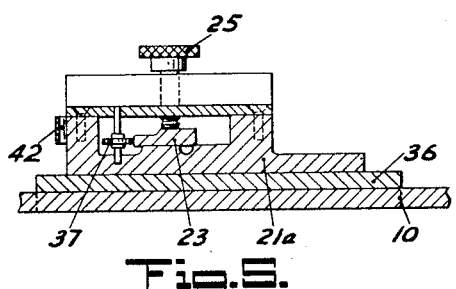
Figure 7:
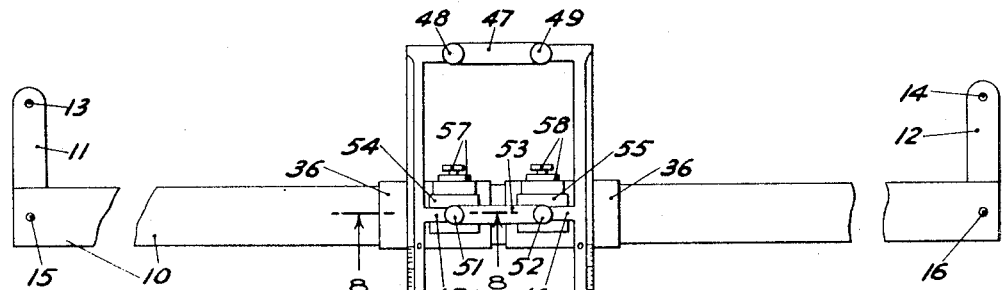
Figure 13:
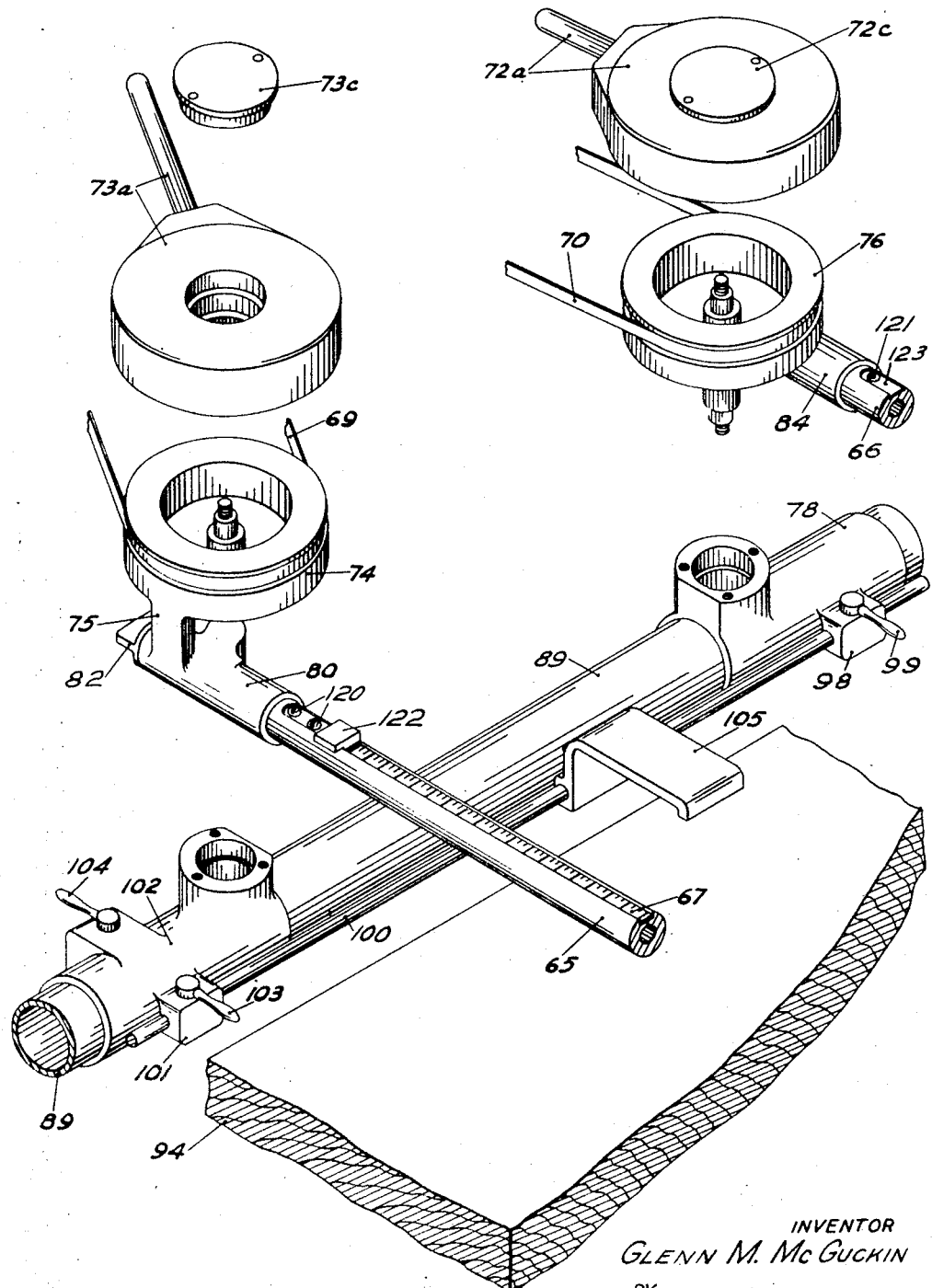

Fig. 4 is a sectional plan view taken on the line 4—4 of Fig. 3;

Fig. 5 is a sectional elevation taken on the line 5—5 of Fig. 4;

Fig. 6 is a sectional elevation taken on the line 6—6 of Fig. 1;

Fig. 7 is a plan view of a modified form of apparatus embodying the invention;

Fig. 8, sheet 6, is a sectional elevation taken on the line 8—8 of Fig. 7;

Fig. 9 is a plan view of a preferred form of apparatus embodying the invention;

Fig. 10 is a sectional elevation taken on the line 10—10 of Fig. 9;

Fig. 11 is in part an elevation and in part a sectional elevation taken on the line 11—11 of Fig. 9;

Fig. 12 is a sectional elevation taken on the line 12—12 of Fig. 9;

Fig. 13 is an exploded perspective view of selected parts of the apparatus of Figs. 9–12;

Fig. 14 is a plan view of a further modified form of apparatus embodying the invention;

Fig. 15 is a fractional side elevation of Fig. 14 and including parts 108 and 112a.

Fig. 16 is a plan view of a modified form of apparatus embodying the invention;

Fig. 17 is a sectional view taken on the line 17—17 of Fig. 16;

Fig. 18 is a sectional view taken on the line 18—18 of Fig. 16;

Fig. 19 is a sectional view taken on the line 19—19 of Fig. 16;

Fig. 20 is a sectional view taken on the line 20—20 of Fig. 16; and

Fig. 21 is a sectional view taken on the line 21—21 of Fig. 20.

Figure 2:
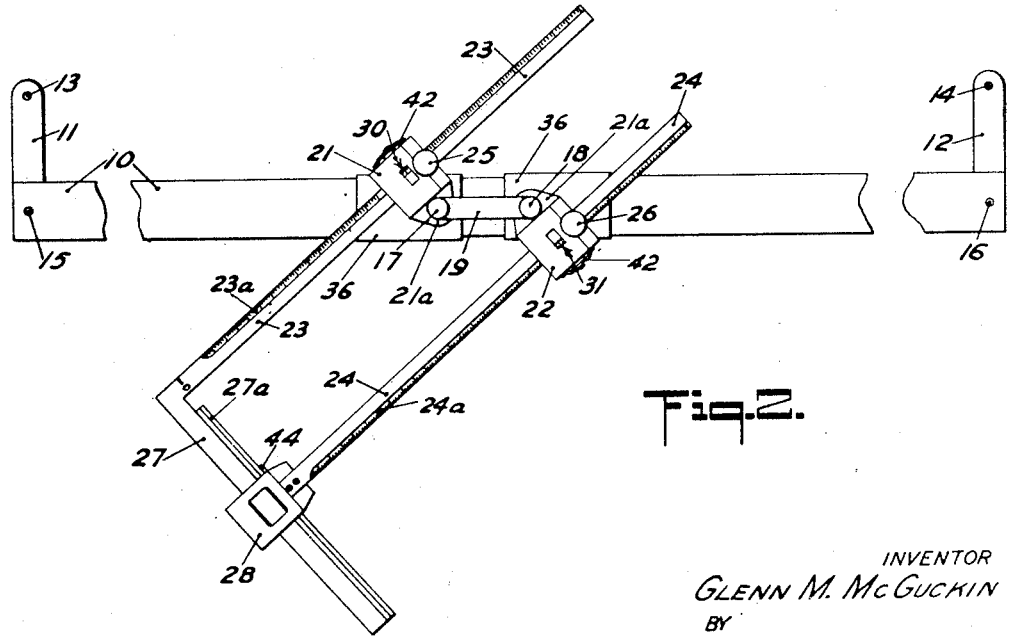
Fig. 2 is a plan view illustrating the apparatus in Fig. 1 in a different position.

Referring to Figs. 1 and 2, the invention has been shown in one form as embodied in an apparatus comprising a horizontal bar or frame 10 having extensions 11 and 12, respectively provided with openings 13 and 14 by means of which thumb tacks may secure the frame 10 in fixed position on a drafting board or table. Additional thumb tacks may be inserted through openings 15 and 16 provided in the straight section of the frame 10 further to anchor the frame and to hold in place a map-blank or a sheet of blank cross section paper disposed therebeneath. The calculating device or instrument is designed to be utilized in connection with the drawing paper, preferably coordinate paper secured to the drawing board or table and on which there has been established in usual manner scales representing depth and a base line indicating a datum plane adjacent the surface of the earth over which a seismic survey has been made. The frame 10 is secured to the drawing board so that the axes of a pair of pivot pins 17 and 18 coincide with the location of two adjacent shotpoints. A link 19 interconnects the pivot pins and has a length on the scale of the coordinate paper corresponding to the distance between the two adjacent shotpoints. Where the spacings between adjacent shotpoints differ, in different surveys, a link 19 of the required length will be utilized. The pivot pins 17 and 18, extending through opposite ends of link 19, are carried by yokes 21 and 22 through each o. which there slidably extends the bars 23 and 24. They may be clamped in fixed positions by means of clamping screws 25 and 26 which are provided with knurled heads. From the bar 23 there extends at right angles thereto an end-portion 27 which is slidably mounted in a yoke 28 secured as by rivets to the end of the bar 24. The bar 23 is provided with a time-scale 23a extending from zero, at a point coinciding with an extension of a scribing surface 27a, to the end of the bar 23. The scale is read from an index 30 on the yoke 21. Similarly, a like scale 24a may be read from an index 31 on the yoke 22.

As shown in the sectional view of Fig. 3, it will be seen that the link 19 is secured to a collar 33 rotatably mounted on the shank of the pivot pin 17 which is threaded at its lower end for threaded engagement with a flanged member 34. This pivotal assembly is carried by the mid-portion of a downturned U-shaped base plate 36, the respective legs of which overlap the sides of the base 10 for slidable movement with respect thereto. The downturned sides or legs of the plate or carriage 36 form guides which engage the sides of the bar 10. The yoke 21 also includes a relatively wide base portion 21a which, it will be observed, is mounted for pivotal movement around a cylindrical portion of the flanged member 34. Accordingly, the yoke may be rotated as a whole about the axis of the pivot pin 17 and of the cylindrical portion of member 34.

As best shown in Fig. 4, the yoke 21 is provided with anti-friction bearings for slidable movement of the bar 23 with respect thereto. These bearings include two rollers 37 and 38 rotatably supported between the base portion 21a and an upper plate 39, Fig. 3. One side of the bar 23 is maintained against the spaced rollers 37 and 38 by a third roller 40 which, at a point intermediate rollers 37 and 38, is pressed against the opposite side of the bar 23. The biasing arrangement includes a slide 41 slidably mounted in channels in the yoke 21, and biased outwardly thereof by a double-ended leaf spring 42. The spring is fastened to the slide 41 with the ends thereof bearing against an end of the yoke or base portion 21a. The spring urges the roller 40 carried at the opposite end of the slide 41 against the bar 23 and maintains the bar in position against rollers 37 and 38.

It is to be understood the yoke 22 is of generally like construction and detailed description thereof is therefore deemed unnecessary. In both cases, friction is reduced to a minimum and the support is mechanically stable, insuring rectilinear movement of each bar through its yoke.

In the yoke 22, Fig. 1, the knurled end 26 of the locking screw serves to clamp in fixed position the bar 24. The construction is the same as for the yoke 21, Fig. 5, where it will be observed the lower end of the clamping screw 25 serves to press the bar 23 against a ledge of the yoke 21 extending lengthwise of the bar 23. The ledge is narrower than the width of bar 23 and serves to reduce sliding friction when the screw 25 is moved to free the bar 23.

The yoke 28 carried by the end of bar 24 also has anti-friction bearings, Fig. 6, one of the rollers of which, the roller 43, is shown.

The rectilinear anti-friction bearings of the two yokes 21 and 22 together with the link 19, maintain the bars 23 and 24 parallel to each other during their movement about their respective pivot pins 17 and 18.

In using the instrument, the bar 23 is moved relative to the yoke 21 and the index 30 until there may be read on the scale 23a the time interval corresponding to the net time below a particular datum, generally the shotpoint, to subsurface strata giving rise to a particular reflection under study. The clamping screw 25 will then be tightened to prevent relative movement between the bar 23 and the yoke 21. The time interval below the second datum point, generally a shotpoint, will then be set on the scale 24a with reference to the index 31 by rotating the bar 24 around its pivot 18. Since the bar 23 is now clamped to the yoke 21, and the bar 24 unclamped, clockwise rotation of the two bars 23 and 24 about their respective pivots 17 and 18 lengthens the distance from the index 31 to the origin of the scale 24a. Accordingly, if the time interval from the datum point for the bar 24 is greater than that for the datum point for the bar 23, the assembly will be moved in a clockwise direction as in Fig. 2. Conversely, if the time interval for the bar 24 is shorter, the assembly will be rotated in a counterclockwise direction correspondingly to shorten the time interval measured on the scale 24a.

The times that are set on the two parallel bars 23 and 24 are ascertained in the following manner: the records for two successive datum points are corrected to a datum plane for (1) the low velocity weathering layer using either calculated weathering times or measured uphole times, and (2) elevation. The two records are time-correlated and total travel times to reflections on the seismic records are counted, corrections calculated therefor, and they are then utilized as the record times which are set on the respective parallel bars 23 and 24 and with reference to the scales 23a and 24a.

If it be assumed that the bar 23 in Fig. 2 has been clamped to correspond with a given time interval at one shotpoint and that the instrument or apparatus has been rotated until there has been set on the bar 24 a longer time interval obtained at another shotpoint, then extension 27 will be inclined downwardly at a substantial angle. The inclination of extension 27 will correspond with the dip of the subsurface strata or reflecting interface which gave rise to the reflection under study. The length of that part of the subsurface strata which gave rise to the reflection is also determined or represented by the distance from the left-hand end of the scribing surface 27a to the left-hand end of a stop member 44, forming a part of the yoke 28. In consequence, a line may be drawn along the scribing surface 27a, the angle of which will show the dip of the reflecting surface with the length thereof representing the length of the surface determined by the two datum points and it will, on the map or seismic profile being made, be located in its offset position, which, in the example assumed, is substantially to one side of lines extending vertically downward from the two datum or shotpoints. The left-hand end of the scribing surface 27a, as viewed in Figs. 1 and 2, is determined by a line extending from the center of the pivot pin 17 normal to the extension 27. A similar normal line from the center of the pivot pin 18 determines the left-hand end of the stop 44. As the bars 23 and 24 are rotated in either a clockwise or counterclockwise direction from the positions shown in Fig. 1, the length of the scribing surface decreases.

For any given position of the apparatus or instrument on the map or drawing board, the location and dip of each reflecting interface which gave rise to a reflection may be determined. As well understood by those skilled in the art, several reflecting surfaces are generally found, one below the other. Since these may all be plotted without moving the instrument to new shotpoints, there is a substantial saving of time. By providing a semi-automatic solution of the problem, the instrument greatly decreases the time required to complete a subsurface map. By showing the true position of the dipping beds, an accurate study thereof is facilitated and better decisions may be made as to the desirability of drilling an oil well in the area under study. The present system makes unnecessary the tiresome and complicated calculations heretofore necessary to locate the true position of dipping beds. The subsurface maps are plotted in terms of depth. Therefore, the time scales 23a and 24a, representative of time intervals, are selected so that with reference to the cross-section paper on which the profile is plotted, they are to the same scale as the cross section for depth determination and with equal horizontal and vertical scales. The fact that bars 23 and 24 approach each other as the dip increases, and vice versa, saves considerable calculation otherwise necessary to determine the length of the reflecting surface between shotpoints.

After all of the reflections recorded between two datum points have been plotted to show the true depth, offset position and dip of subsurface strata, the entire assembly is moved along the frame 10 to the next position for the next two datum points. To guard against accidental movement relative to the frame 10, clamping means, such as a thumbscrew for each base plate 36, may be provided. In the new position, all of the reflections are then plotted and the process repeated for all of the datum points along the particular seismic profile under study. When the assembly, including the bars 23 and 24, has been moved to one end of the frame 10, the thumb tacks through the openings 15 and 16 are removed and the cross-section paper can then be moved the full length of the frame 10 without removing the instrument from the table. After the paper is again positioned beneath the frame 10, the thumb tacks are replaced in the openings 15 and 16 and the subsurface strata from a new series of datum points may then be plotted.

In accordance with the modification of Figs. 7 and 8, the apparatus or instrument embodying the invention is of somewhat simpler construction. The bars 45 and 46 carrying scales 45a and 46a have inturned ends connected together by a link 47 and a pair of pivot pins 48 and 49. Additional inturned projections 45b and 46b are respectively interconnected by a link 53 pivotally secured thereto by pins 51 and 52. The links 47 and 53 correspond with the link 19 of Figs. 1 and 2, and serve not only to space the pivot pins 51 and 52 a distance from each other equal to the datum separation distance but also to maintain bars 45 and 46 parallel to each other. The pivot pins 51 and 52 are carried by members 54 and 55 which are in turn rigidly secured to plates 36, each of which is slidably carried by the frame 10 as above described. Extending through the base plates 36 are a pair of clamping screws and nuts 57 and 58, by means of which the center-assembly may be clamped to the frame 10. In this case, the scales 45a and 46a have their points of origin in line with or below the pivot pins 51 and 52 and extend downwardly toward the respective ends of the bars. They are read from the lower edge of the horizontal bar 60 which is secured to a yoke 61, provided with anti-friction means, slidably carried by bar 45, and which may be clamped thereto by means of a clamping screw 62.

In this modification of the invention there is no physical interconnection between the bar 60 and the bar 46. In use, the yoke 61 is moved along the scale 45a until the lower edge thereof corresponds with the net time for its datum point. The bars 45 and 46 are then rotated in one direction or the other until the lower face of the bar 60 is moved to a position on the scale 46a corresponding with the net time below its datum point for the same reflection. A stop 63, slidable on bar 46, has one end abutting a ledge above the scribing section 27a of bar 60 and it has an extension 63a which forms a stop for a marker as explained in connection with stop member 44 of Figs. 1 and 2. As before, the dipping subsurface segment of the seismic interface or reflecting bed is located and it may be traced in direction and length on the cross section by moving a marker along that part of the scribing surface 27a located to the left of stop 63a, as viewed in Fig. 7. The two links 47 and 53 maintain the bars 45 and 46 parallel to each other. In general, the operation of the instrument is somewhat smoother than with the previously described modification.

Though either of the previously-described instruments or apparatus will be found satisfactory, the preferred form of the invention has been illustrated in Figs. 9–13. In accordance with the preferred arrangement, bars 65 and 66, respectively carrying scales 67 and 68, are maintained parallel to each other by means of endless tapes or belts 69 and 70 which operate in manner similar to those used on drafting instruments to maintain, in lieu of a T-square, a drawing bar parallel to the base during movement over any part of a drawing board. As applied to the present invention, the tape or belt 69 is carried by a pulley 71, Fig. 10, the pulley being supported in anti-friction bearings respectively carried by flanges on the ends of arms 72 and 73, Fig. 9. The tape or belt 69 passes around a pulley 74 forming a part of a frame member 75, Fig. 11, which is itself pivotally mounted in a carriage 102. Similarly, the tape 70 interconnects the pulley 71 and a pulley 76, Fig. 10, forming a part of a frame member 77 which is itself supported in an anti-friction bearing from a carriage 78. The respective bars 65 and 66, Fig. 9, are rigidly secured to the frame members 75 and 77 of the pulleys 74 and 76. For example, the frame member 75, Figs. 11 and 13, is provided with an elongated socket or tubular extension 80 into which the end of the tubular bar 65 extends. The bar 65 is pulled tightly against a shoulder 81 by means of a locking cap or member 82, Figs. 9 and 11, having a threaded end engaging a threaded insert 83 held in place at the end of the tubular bar 65 by a locking pin 79. The bar 66 is similarly held in place in a tubular extension 84 of the pulley 76 by a locking cap or member 85, Fig. 10. The construction may be readily understood by reference to Fig. 13 where selected parts have been shown in an exploded perspective view.

The lower end of the pulley frame 77, Fig. 10, is provided with a threaded extension for a nut 86 which retains the anti-friction or ball bearing 87 in place on frame 77. The assembly is retained in carriage 78 by the enlarged heads on race-retaining screws 88. The carriage 78 is slidably mounted on an elongated frame or tubular bar 89, closed at its ends, Fig. 9, by caps 89a and 89b. The caps have been omitted from Figs. 10 and 11 to simplify the drawings. The frame 89 is supported from clamping brackets 91 and 92, each of which, as shown in Fig. 10, is provided with a clamping screw 93 for anchoring each clamping bracket to the drawing table or board 94.

The clamping brackets 91 and 92 may be adjusted lengthwise of the tubular bar 89 but in general they will be clamped by levers 95 and 96, Fig 9, in fixed positions adjacent the ends thereof. The carriage 78, Fig. 10, is provided with divided clamping members 98 extending outwardly therefrom and operable by a lever 99 into and out of clamping engagement with a rod 100 which, Fig. 9, extends along and parallel to the tubular frame member 89. The rod 100 extends through similar clamping members 101 extending from the carriage 102 which supports the pulley member 74—75, and which are operable by a lever 103 into clamping engagement with rod 100. The carriage 102, Fig. 9, is also provided with clamping members operable by a lever 104 into and out of clamping engagement with the frame 89. The bar 100 may be calibrated or may bear a scale in terms of separation distance between the datum points. Accordingly, the bar 65 and its associated pulley structure 74 will be moved to a first datum position and the lever 104 operated to clamp the carriage 102 to the tubular bar 89. The rod 100 will then be adjusted until the zero position of its scale is properly fixed. By then moving the carriage 78 until the proper distance can be read on the scale or rod 100, the carriage 78 may be located above the second datum point after which the lever 99 is operated to clamp carriage 78 in fixed position and to the rod 100. The rod 100, however, need not be provided with a scale if a scribing member 105 be slidably mounted on rod 100 as shown on the drawing. The width of the scribing bar 105 is such that when it is moved to the left and against the clamping member 101, its right-hand edge will be in exact alignment with the center of the pulley 74. Accordingly, the position of the carriage 102 may then be exactly determined from the scale utilized on the cross-section paper. Similarly, when the scribing member 105 is moved to the right and into engagement with the clamping member operable by the lever 99, the left-hand edge of the scribing member 105 is in alignment with the center of the pulley 76, and the carriage 78 may be located in a fixed and predetermined position. The scribing member 105 provides an accurate means of transferring to the cross-section paper, lines which intersect the centers of the pulleys 74 and 76. After the carriages 78 and 102 have been located, as desired, the apparatus may then be utilized and operated in the manner described in connection with Figs. 1 to 8, or advantage may be taken of further features, such, for example, as the relatively movable mounting of the scribing bar 108 which, as will be observed in Fig. 12, is slidably carried by dovetailed projections 109 and 110 extending from carriages 111 and 112 slidably mounted on the bars 65 and 66.

The upwardly extending arm of the scriber bar 108, Fig. 12, is provided with a clamping lever 114 which secures it in fixed position to the dovetailed projection 109. Similarly, a clamping lever 115 clamps to dovetailed projection 110 a downwardly extending guiding foot 116 which slidably bears upon the scribing element 108. It will be observed that the carriages 111 and 112 are respectively provided with scales 117 and 118 visible through windows. Accordingly, if it is desired to incorporate a correction in the position of the scribing bar 108 with reference to the scales 67 and 68, the scribing bar 108 may be moved relative to the carriages 111 and 112 by loosening the clamping levers 114 and 115. The introduction of a correction of this character is sometimes desirable where the surface profile of the area explored by a seismic survey is of highly irregular elevation. If the terrain consists of a plurality of hills and valleys with sharp or slight erosional patterns, it may be desirable to adjust all reflection times, not to a flat datum surface, but to a warped reference surface which, for purposes of computation and plotting, is taken at approximately the depth of the shotpoints below the actual land surface. Minor erosional relief patterns are ignored in fixing the warped reference surface which, therefore, averages out the sharp contour changes and yet does not result in a flat datum plane which does not take into account the larger or average changes in surface elevations or topography.

The necessary corrections for the reflection time at each shotpoint may be directly introduced into the apparatus or instrument of Fig. 9 by moving the scribing bar 108 until the scale 117 shows the desired depth-correction reading with respect to an index marked on the carriage 111; and similarly with respect to the carriage 112. After the desired corrections have been introduced, the clamping levers 114 and 115 secure the bar 108 to the carriages 111 and 112 and the operations from that point on are as already described, suitable clamping levers 62 and 62a being provided for the carriages 111 and 112.

In each form of the invention, the scales 23a, 24a, Figs. 1 and 2, 44 and 45 of Figs. 5 and 6, and 67, 68 of Figs. 7–10, may be marked on tape, paper, or other material. They are prepared by utilizing time-depth data already secured from the area being explored. These scales though marked in terms of time, serve to convert time intervals into distances which correspond with the particular scale used on the cross-section paper mounted on the drawing table or board 94. Since the scales will differ from one locality to another, provision is made for convenient interchangeability. Since they are removable, they are not fastened to the bars 65 and 66 except at the upper ends where screws 120 and 121 serve to press clamping members 122 and 123 against the upper ends thereof. The scales, on paper tape, extend along the guiding channels to the ends of the bars where they are maintained under tension by an assembly illustrated in detail in Fig. 10, for the bar 66. The bar 66 is provided adjacent its open end with a plug 124 which supports one end of a spring 125, the opposite end of which presses outwardly on a plunger 126. The plunger terminates in an enlarged end 128 around which there is pivotally mounted a U-shaped clamping member 129. If the clamping member 129 is rotated upwardly around its pivot, the end of the paper tape bearing the scale 68 will be released. In mounting the scale 68 in the channel, the plunger 126 is moved inwardly against the bias of the spring 125 and the scale 68 is pulled snugly around the enlarged end 128. The clamping member 129 is then rotated in a clockwise direction until it tightly clamps the end of the scale or tape 68 against the enlarged end 128. On release of the enlarged end 128 the spring 125 is thereafter effective to keep the tape-scale 68 under slight tension to maintain it flat in the channel and to prevent curling which might occur as a result of change in humidity. The tape 67 of the arm 65 is similarly held in position by a like assembly including the clamping member 130.

In order to keep the steel-belts 69 and 70 taut, the arms 72 and 73 are provided with adjusting means shown in Fig. 9 as hexagonal sleeves 131 and 132. In Fig. 10 the sleeve 132 will be seen to enclose a core 133 having extensions which engage the head of a screw 134 threadedly mounted within an opening provided in the arm 72. By rotating the hexagonal sleeves 131 and 132 in one direction or the other, the tension on belts 69 and 70 may be increased or decreased. The sleeve assemblies including the arms 72—72a and 73—73a terminate at the respective ends thereof in bearing-supporting flanges. Access to the ball bearings may be had through threaded closure members 72c, 73c, Figs. 10 and 13. The parallel driving means for the bars 65 and 66 is self-supporting through the aforesaid arms 72—72a and 73—73a.

Advantage may be taken of the self-supporting feature of the parallel driving means in constructing a further modified form of the invention as illustrated in Fig. 14.

In Fig. 14, the arms 65 and 66 and a scribing bar 108 may be of the same general construction as in the preceding figures, except that no provision is made for relatively positioning the scribing bar 108 with respect to the carriage 111 though that feature may, of course, be included if desired. A carriage 112a is slidable along the bar 66 and it has a downturned end which forms a stop 112b, Fig. 15, for the end of the scribing bar 108. The apparatus of Figs. 14 and 15 differs from that of Figs. 9–13 in that the pulley members 74 and 76 and their frames are respectively carried by slides 136 and 137 which extend through carriages 138 and 139 mounted on a base bar 142. The carriages include clamping levers 140 and 141 for clamping the slides 136 and 137 in predetermined positions. Like the modification of Figs. 9–13, the carriages 138 and 139 are interconnected by the rod 100 bearing a scale. The slides 136 and 137 also have marked thereon scales 143 and 144 calibrated in terms of time-depth and which may be utilized to position the slides 136 and 137 for introduction of corrections for the change in surface topography and to bring all readings, as previously explained, into proper relation with a predetermined warped datum plane which is related to the surface topography. On the drawing table 94 of Fig. 14 the line which is representative of a reflecting interface located by means of apparatus embodying the present invention would be drawn between the stops 145 and 146.

It will be observed that in Fig. 9 the warped-surface correction is made along the slanting direction of bars 65 and 66, while in the modification of Fig. 14 the warped-surface correction is made in a direction normal to the supporting bar 142. The particular corrections made for the warped-surface may, of course, take into account this difference in the operation as between the modification of Fig. 9 and that of Fig. 14, but the difference is so slight it may be neglected, particularly for the smaller angles of dip.

In Figs. 16–21 there is illustrated a further modification of the invention so designed that it lends itself to fabrication from wood or plastic materials and yet will function as easily as the foregoing modifications. More particularly, the frame 210 having thumb-tack openings 13—16, is of channel construction, Figs. 17 and 20. Slidably mounted in the frame 210 is a subframe 211 of generally like configuration and which includes side elements which nest under overhanging shoulders formed in the channel of the frame 210. The subframe 211 of channel shape carries a second slidable subframe 212. The bars 215 and 216 are respectively pivoted at 217 and 218 to the subframes 211 and 212 as by pivot pins, one of which, the pivot pin 218, is shown in detail in Fig. 17.

Differing with earlier-described modifications, the bars 215 and 216 are maintained parallel with each other by reason of their pivotal connections at their opposite or free ends with a link 220. The pivot pin 221 for the bar 215 is of similar construction to the pivot pin 222 for the bar 216 shown in detail in Fig. 18, except that the pivot pin 221 is threaded directly into the link 220 while the pivot pin 222 is threaded into a slide 224 carried by a channel provided in the link 220.

The operation of the apparatus will be readily understood from the description of the modifications already described. Briefly, the subframe 211 is clamped to frame 210 into a desired position by a clamping screw 225. By reference to a scale 226 provided on the frame 211, the subframe 212 is clamped by operation of the clamping screw 228 in a predetermined position to fix the distance between the bars 215 and 216. The slide 224 is then moved until the spacing between the opposite ends of the bars 215 and 216 corresponds with that as determined on the scale 226. This may be readily determined by reference to the scale 230 on the link 220. A clamping screw 231 may then be operated to hold the slide 224 fixed with respect to the link 220. The cross bar 232 is attached as by screws 233 to a slider 234 carried by the channel section 215a of the bar 215. The slider 234 is made of substantial length so as to insure that the cross bar 232 is maintained at right angles to the bar 215, and with a minimum of play which may, if any exists, be eliminated by slidable springs carried by the slider 234. The cross bar 232 is further strengthened by the addition of a second cross bar 240, Fig. 19, secured to a spacing block 241 and which is also secured to the cross bar 232.

The cross bar 232 is moved along a removable scale 242 until an edge thereof corresponds with the net time for a datum point. A clamp 243 is then tightened to hold the cross bar 232 to the bar 215. The assembly is then rotated to the right or to the left about the pivots 217, 218 until the edge of the cross bar 232 is positioned on a removable scale 244 at a point corresponding with the net time below the other datum point for the same reflection. A line may then be drawn on the cross-section paper, the cross bar 240 being used as the guide or straight-edge for drawing the line representative of the dip for the reflection under study.

While the clamping means for the several slidable members may be of any desired construction, a relatively simple one has been illustrated in Figs. 20 and 21. Though each of the clamping means may be of identical construction, the one including the clamping screw 225 is shown. It is carried by a cover plate 250 and has attached to its shank a cam 251 arranged to bear against a spring 252 to force a frictional member 253 against a side 254 of the frame 210. When the clamping screw 225 is rotated from the position shown in Fig. 21, the pressure exerted on the frictional member 253 is released and the spring moves it away from the engaged surface 254.

For convenience in accurately locating the pivots 217 and 218 above shot points located on the section paper, extensions or guides 256 and 257 respectively secured at their upper ends as by screws, Fig. 17, extend to positions just above or clear of the section paper with which the instrument is used. By providing guides 256 and 257 in line with pivots 217 and 218 and at the locations on the section paper of the shot points the initial adjustments may be made without errors due to parallax and the like. The same functions are performed by the scribing member 105 of Fig. 9.

In the modifications of Figs. 16-21, the cross bars 232 and 240 may be of a transparent material, such as that available on the market under the trade names "Lucite" and "Plexiglas." Accordingly, a center line 232a may be suitably scratched or milled into the surface for use in determining the position of the cross bar 232 with respect to the scales 242 and 244. Other parts may also be of either plastic or wood though metal may sometimes be preferred, the important point here being that the location of the link 220 at the ends of the bars 215 and 216 remote from the frame 210 provides added rigidity and minimizes error due to the deflection of such bars as a result of their inherent elasticity.

Now that typical applications of the invention have been fully described, it is to be understood that further modifications of the invention may be made without departing from the scope of the appended claims.

What is claimed is:

1. An apparatus for plotting seismic data comprising a frame, a pair of carriages slidable along said frame, means for clamping said carriages in fixed positions with the distance between them corresponding with the separation distance between two datum points, a bar pivotally mounted for pivotal movement about a pivot held stationary by one carriage and extending away from one of said datum points, a second bar pivoted for movement about a pivot held stationary by the other of said carriages and extending away from said other of said datum points, each of said bars carrying scales of time-depth, a scribing bar slidably mounted from one of said bars and extending at right angles thereto, and means interconnecting said bars to maintain them parallel to each other during pivotal movement thereof.

2. An apparatus for plotting seismic data comprising a pair of arms having time-depth scales, a frame, means pivoting each of said arms in fixed relation with said frame at distances one from the other corresponding with the distance between two datum points, means separate from said frame interconnecting the pivoted ends of said arms for maintaining them parallel one to the other during pivotal movement, means including a scribing bar slidable along one of said arms and a clamp for holding said scribing bar in fixed relation thereto and extending at right angles to said one bar at a distance from its pivoted end corresponding with a seismic time interval, pivotal movement of said arm and of said clamped scribing bar thereafter being effective to change the distance from said scribing bar to the pivoted end of said other bar to correspond with a second seismic time interval thereby to position the scribing bar both as to depth and as to the angle of the reflecting surface which gave rise to the seismic time intervals.

3. An apparatus for plotting the location and dip of reflecting interfaces comprising carriage means, a frame supporting said carriage means, a pair of arms each pivotally mounted on said carriage means a distance one from the other equal to the separation distance between two datum points, means spaced from said carriage means and interconnecting said arms for maintaining them parallel with each other during pivotal movement thereof, a scribing bar extending at right angles to at least one of said bars, and means for relatively adjusting the distances between the pivots on said carriage and said scribing bar to predetermine its position and thereby locate the position and dip of said reflecting interface subsurface strata.

4. An apparatus for plotting the location and dip of reflecting subsurface interfaces comprising a frame, carriage means slidable along said frame, two arms pivotally mounted from said carriage at a distance one from the other corresponding to the separation distance between two datum points, each of said arms having scales along which may be measured time intervals determined from reflections from subsurface interfaces, a pair of endless belts, pulley elements rigidly carried by corresponding ends of said bars for supporting corresponding ends of said belts and a third pulley member for supporting the opposite ends of said belts, a pair of arms extending from said pulley members to support said third pulley member with said belts under tension thereby to maintain said bars parallel to each other during pivotal movement thereof, a scribing bar movable lengthwise of said bars, and means for maintaining said scribing bar at right angles to at least one of said bars.

5. An apparatus for plotting the location and dip of reflecting subsurface interfaces comprising two bars having time scales extending along the lengths thereof, carriage means for pivotally supporting corresponding ends of said bars from each other at a distance corresponding to the separation distance between two datum points, means for maintaining said bars parallel one to the other during pivotal movement thereof, a scribing bar, means carried by one of said bars for holding said scribing bar at right angles thereto and at a selected distance from the pivoted end thereof, and means for adjusting the position of said scribing bar relative to said carriage means.

6. An apparatus for plotting the location and dip of reflecting subsurface interfaces comprising a frame, two bars carrying time-depth scales, means pivotally supporting corresponding ends of said bars in fixed relation with said frame at a distance one from the other along said frame corresponding with the separation distance between datum points, carriages on each of said bars, a scribing bar slidably mounted between said carriages, the carriage and slidable means on one of said bars being so constructed and arranged as to maintain said scribing bar at right angles thereto, means for clamping each of said carriages in selected positions along its associated bar, and means for clamping said scribing bar in a selected position relative to one of said carriages and independently of the position of said one carriage on its associated bar.

7. An apparatus for plotting depth and dip of subsurface reflecting interfaces comprising a frame, two bars pivotally mounted to said frame at a distance one from the other corresponding with the separation distance between two datum points, means interconnecting corresponding ends of said arms to maintain them parallel during pivotal movement, each of said arms having time-depth scales on which may be read the time interval of a reflection at each datum point, a scribing bar extending at right angles between said bars and at positions with respect to said scales corresponding with said time intervals, and means for relatively adjusting said pivoted ends of said bars with respect to said frame to introduce time-interval corrections independent of the position of said scribing bar with respect to said scales.

8. An apparatus for plotting depth and dip of subsurface reflecting interfaces comprising a frame, two bars pivotally mounted on said frame at a distance one from the other corresponding with the separation distance between two datum points, means interconnecting corresponding ends of said arms to maintain them parallel during pivotal movement, each of said arms having time-depth scales on which may be read the time interval of a reflection at each datum point, a scribing bar extending at right angles between said bars and at positions with respect to said scales corresponding with said time intervals, and slidable means for the pivoted ends of each of said bars carried by said frame for adjusting their positions relative to said frame without disturbing the position of said scribing bar with respect to said scales for introduction of desired corrections in the final position of said scribing bar.

9. An instrument for contour plotting of subsurface strata comprising a pair of members pivotally mounted at points spaced in correspondence with the distance between seismic datum points, means for holding said pivot points stationary during pivotal movement of said pair of members, a scale on each of said members calibrated in terms related to seismic-reflection times, and a dip-bar extending at right angles to both of said members for all angular positions thereof and adjustable with respect to the pivotal axes of said members.

10. An instrument for contour plotting of subsurface strata comprising a pair of members having pivotal supports at points spaced in correspondence with the distance between seismic datum points and slidable in parallelism with each other, means interconnecting said members for maintaining them parallel, a scale on each of said members calibrated in terms related to seismic-reflection times, and a dip-bar extending at right angles to both of said members for all positions thereof.

11. An instrument for contour plotting of subsurface strata comprising a pair of members pivotally mounted at points spaced in correspondence with the distance between seismic datum points, means for holding said pivot points stationary during pivotal movement of said pair of members, a scale on each of said members calibrated in terms related to seismic-reflection times, a dip-bar slidably supported by at least one of said members and coacting with both of said scales, and structure holding said dip-bar normal to said members for all angular positions thereof.

12. An instrument for contour plotting of subsurface strata comprising a pair of members pivotally mounted at points spaced in correspondence with the distance between seismic datum points, means for holding said pivot points stationary during pivotal movement of said pair of members, means interconnecting said members to maintain parallelism thereof for their different angular positions, a scale on each of said members calibrated in terms related to seismic-reflection times, and a dip-bar slidably supported by at least one of said members and extending at right angles to both of them for cooperation with said scales.

13. An instrument for contour plotting of subsurface strata comprising a pair of members pivotally mounted at points spaced in correspondence with the distance between seismic datum points, a scale on each of said members calibrated in terms related to seismic-reflection time, a dip-bar slidably supported by at least one of said members and coacting with both of said scales, and slidable means for positioning said dip bar in correction of erosional patterns upon seismic-reflection time.

14. An apparatus for plotting the location and dip of reflecting subsurface interfaces comprising two bars having time scales extending along the lengths thereof, a frame, carriage means slidably mounted with respect to said frame for pivotally supporting corresponding ends of said bars at a distance one from the other corresponding with the separation distance between two datum points, a link adjacent the opposite ends of said bars, pivotal means interconnecting said link and said opposite end of one of said bars, a slide slidably mounted with respect to said link, means pivotally interconnecting said slide and said opposite end of the other of said bars for maintaining said bars parallel one to the other during simultaneous pivotal movement thereof, a cross bar, and means carried by one of said bars for holding said cross bar at right angles thereto and at a selected distance from one pivoted end thereof.

15. An apparatus for plotting the location and dip of reflecting subsurface interfaces comprising an elongated frame member, two carriages supported by said frame and slidable lengthwise thereof, means for holding said carriages at a distance one from the other corresponding with the separation distance between two datum points, a pair of bars respectively pivotally connected to each of said carriages, a link pivotally interconnecting said bars at points spaced from said carriages which link in cooperation with the pivotal mounting of said bars on said carriages maintains them parallel during simultaneous pivotal movement relative to said carriages, and a dip-bar, structure slidably supporting said dip-bar from one of said members for holding said dip-bar at right angles thereto and in cooperative relation with the other of said bars, the distance from one of said pivotal connections on one of said carriages to said dip-bar varying with angular movement of said bars while the distance from the other pivot on said other carriage to said dip-bar is maintained constant during such angular movement.

16. An apparatus for plotting the location and dip of reflecting subsurface interfaces comprising an elongated frame member, two carriages supported on and independently slidable with respect to said frame member, each said carriage supporting pivoting structure, two bars respectively pivotally mounted on said pivoting structure and adapted to have a spacing along said frame a distance one from the other corresponding with the separation distance between two datum points, structure interconnecting said bars for maintaining them parallel one to the other during pivotal movement thereof with respect to said frame member, a scribing bar, said scribing bar and one of said two bars having cooperating structure for holding said scribing bar at right angles thereto, said scribing bar extending beyond and in overlapping relation with the other of said two bars.

GLENN M. McGUCKIN.

REFERENCES CITED

The following references are of record in the file of this patent:

UNITED STATES PATENTS

| Number | Name | Date |
| --- | --- | --- |
| 570,157 | Edmiston | Oct. 27, 1896 |
| 1,471,963 | Lagergren | Oct. 23, 1923 |
| 1,872,578 | Hampton | Aug. 16, 1932 |
| 2,217,720 | Anderson | Oct. 15, 1940 |